United States Patent
Okada

(10) Patent No.: US 12,445,378 B2
(45) Date of Patent: Oct. 14, 2025

(54) ADVERTISEMENT OF ROUTING INFORMATION IN NETWORK MANAGEMENT

(71) Applicant: RAKUTEN MOBILE, INC., Tokyo (JP)

(72) Inventor: Yoshimi Okada, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 17/792,056

(22) PCT Filed: Apr. 6, 2022

(86) PCT No.: PCT/JP2022/017144
§ 371 (c)(1),
(2) Date: Jul. 11, 2022

(87) PCT Pub. No.: WO2023/195089
PCT Pub. Date: Oct. 12, 2023

(65) Prior Publication Data
US 2024/0179093 A1    May 30, 2024

(51) Int. Cl.
*H04L 45/748*   (2022.01)
*H04L 45/02*    (2022.01)
*H04L 45/12*    (2022.01)

(52) U.S. Cl.
CPC .......... *H04L 45/748* (2013.01); *H04L 45/02* (2013.01); *H04L 45/123* (2013.01)

(58) Field of Classification Search
CPC ...... H04L 45/748; H04L 45/02; H04L 42/123
USPC ......................................................... 709/238
See application file for complete search history.

(56) References Cited

U.S. PATENT DOCUMENTS

| | | | |
|---|---|---|---|
| 8,073,968 B1* | 12/2011 | Shah | H04L 45/00 709/238 |
| 2006/0268681 A1* | 11/2006 | Raza | H04L 45/02 370/216 |
| 2007/0008949 A1* | 1/2007 | Balandin | H04L 45/54 370/351 |
| 2009/0257439 A1* | 10/2009 | Xu | H04L 45/033 370/389 |
| 2020/0084103 A1* | 3/2020 | Miller | H04L 45/586 |

FOREIGN PATENT DOCUMENTS

JP        2019-145922 A    8/2019

\* cited by examiner

*Primary Examiner* — Ario Etienne
*Assistant Examiner* — Kidest Mendaye
(74) *Attorney, Agent, or Firm* — Sughrue Mion, PLLC

(57) ABSTRACT

A network management apparatus comprises: an acquisition unit (21) configured to acquires IP prefix information managed in each of one or more subnetworks in a first network as routing information; an aggregation unit (22) configured to generate aggregated IP prefix information which is an aggregation of the IP prefix information managed in each of the one or more subnetworks as aggregated routing information; and an advertising unit (23) configured to advertise the route information and the aggregated routing information to a second network different from the first network.

2 Claims, 6 Drawing Sheets

ADVERTISEMENT OF ROUTING INFORMATION IN NETWORK MANAGEMENT

CROSS REFERENCE TO RELATED APPLICATIONS

This application is a National Stage of International Application No. PCT/JP2022/017144 filed Apr. 6, 2022.

TECHNICAL FIELD

The present invention relates to a technology for advertising routing information.

BACKGROUND ART

Conventionally, in order to reduce the number of routes distributed in an IP network, a technology for aggregating a plurality of prefixes and replacing them with a single route, and advertising the aggregated routing information to other devices is known. For example, a router in a network may aggregate a plurality of IP prefixes of the network connectable to the router and advertise the aggregated IP prefix to other networks (Patent Literature 1).

LISTING OF REFERENCES

Patent Literature

PATENT LITERATURE 1: Laid-open Publication of Japanese patent Application No. 2009-145922 A

SUMMARY OF THE INVENTION

Problems to be Solved by the Invention

As mentioned above, conventionally, only an aggregated IP prefix is advertised to routers in other networks. However, advertising only the aggregated IP prefix may cause inefficient network operation.

For example, a case where a router in a second network acquires aggregated IP prefixes which were advertised from a plurality of border routers in a first network (i.e., a plurality of edge routers in the first network) is assumed. In this case, each of the aggregated IP prefixes may indicate information of the same aggregated prefix indicating the first network. When a router in the second network transmits a packet received from a terminal in the second network to a terminal in the first network, the router in the second network may forward the packet to one of the border routers in the first network since it was advertised the aggregated IP prefixes indicating the first network.

Under the above assumption, for example, in a case where the border router in the first network to which the packet was forwarded is far away from a router directly connected to the destination terminal, the packet may be transferred between routers in the first network for extra time, and thus the packet would travel a long way to reach the destination terminal.

In addition, in a case where the border router in the first network to which the packet was forwarded is a different router than a router directly connected to the destination terminal and the first network is fragmented, the packet would not be forwarded to the destination terminal.

The present invention has been made in order to the above mentioned problems and an object thereof is to provide a technique for advertising routing information to improve the efficiency of network operations.

Solution to Problem

In order to solve the above mentioned problems, according to one aspect of the present invention, there is provided a network management apparatus which comprises: an acquisition unit configured to acquire IP prefix information managed in each of one or more subnetworks in a first network as routing information; an aggregation unit configured to generate aggregated IP prefix information which is an aggregation of the IP prefix information managed in each of the one or more subnetworks as aggregated routing information; and an advertising unit configured to advertise the route information and the aggregated routing information to a second network different from the first network.

The advertising unit may advertise cost information for each of the one or more subnetworks.

The cost information may indicate a distance from a predetermined location in each of the one or more subnetworks to a location of the network management apparatus.

In order to solve the above mentioned problems, according to another aspect of the present invention, there is provided a network management apparatus which comprises: a receiving unit configured to receive a packet from a terminal apparatus in a first network that is destined for another terminal apparatus in a second network different from the first network; an acquisition unit configured to acquire routing information and aggregated routing information advertised from each of a plurality of network apparatus in the second network; a determination unit configured to determine a destination apparatus for the packet in the second network based on the route information and the aggregate route information; and a forwarding unit configured to forward the packet to the determined destination apparatus, wherein the routing information is IP prefix information managed in each of one or more subnetworks in the second network, and the aggregated routing information is aggregated IP prefix information which is an aggregation of the IP prefix information managed in each of the one or more subnetworks.

The acquisition unit may acquire cost information for each of the one or more subnetworks, and the determination unit may determine the destination apparatus based on the routing information, the aggregated routing information, and the cost information.

The cost information may indicate a distance from a predetermined location in each of the one or more subnetworks to a location of the network management apparatus.

In order to solve the above mentioned problems, according to yet another aspect of the present invention, there is provided a network management method which comprises: acquiring IP prefix information managed in each of one or more subnetworks in a first network as routing information; generating aggregated IP prefix information which is an aggregation of the IP prefix information managed in each of the one or more subnetworks as aggregated routing information; and advertising the route information and the aggregated routing information to a second network different from the first network.

In order to solve the above mentioned problems, according to yet another aspect of the present invention, there is provided a network management method which comprises: receiving a packet from a terminal apparatus in a first network that is destined for another terminal apparatus in a second network different from the first network; acquiring routing information and aggregated routing information advertised from each of a plurality of network apparatus in the second network; determining a destination apparatus for the packet in the second network based on the route information and the aggregate route information; and forwarding the packets to the determined destination apparatus, wherein the routing information is IP prefix information managed in each of one or more subnetworks in the second network, and the aggregated routing information is aggregated IP prefix information which is an aggregation of the IP prefix information managed in each of the one or more subnetworks.

In order to solve the above mentioned problems, according to yet another aspect of the present invention, there is provided a storage medium storing a control program for causing a computer to execute network management processing, the program causing the computer to execute processing, comprises: an acquiring process for acquiring IP prefix information managed in each of one or more subnetworks in a first network as routing information; an aggregating process for generating aggregated IP prefix information which is an aggregation of the IP prefix information managed in each of the one or more subnetworks as aggregated routing information; and an advertising process for advertising the route information and the aggregated routing information to a second network different from the first network.

In order to solve the above mentioned problems, according to yet another aspect of the present invention, there is provided a storage medium storing a control program for causing a computer to execute network management processing, the program causing the computer to execute processing, comprises: a receiving process for receiving a packet from a terminal apparatus in a first network that is destined for another terminal apparatus in a second network different from the first network; an acquiring process for acquiring routing information and aggregated routing information advertised from each of a plurality of network apparatus in the second network; a determination process for determining a destination apparatus for the packet in the second network based on the route information and the aggregate route information; and a forwarding process for forwarding the packets to the determined destination apparatus, wherein the routing information is IP prefix information managed in each of one or more subnetworks in the second network, and the aggregated routing information is aggregated IP prefix information which is an aggregation of the IP prefix information managed in each of the one or more subnetworks.

Advantageous Effect of the Invention

According to the present invention, it makes it possible to provide a technique for advertising routing information to improve the efficiency of network operations.

DESCRIPTION OF EMBODIMENTS

Figure 1:
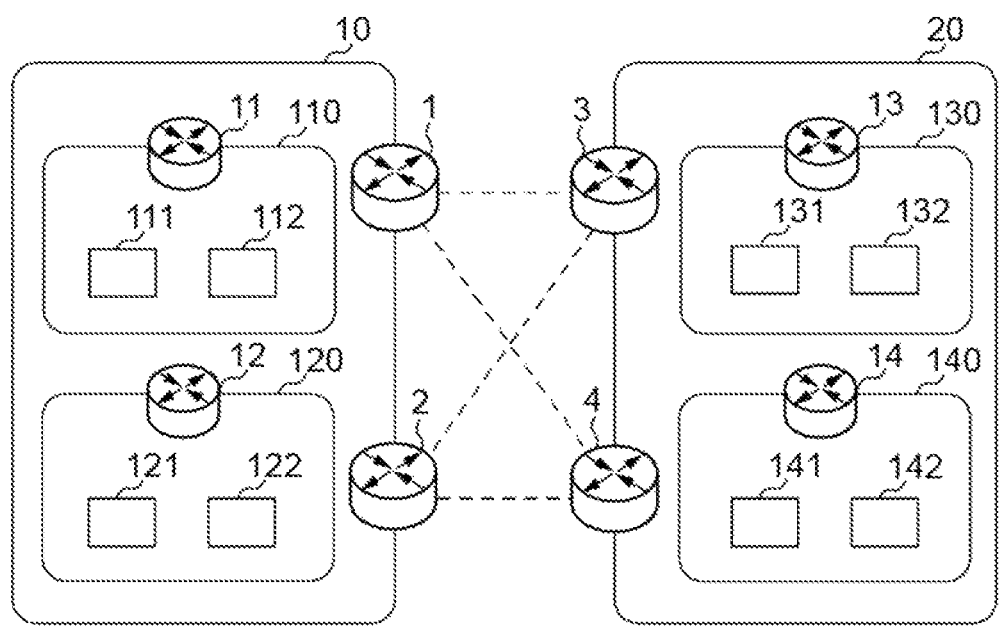
FIG. 1 illustrates an example of a network configuration according to the present embodiment.

Hereinafter, embodiments of the present invention will be described in detail with reference to the accompanying drawings. Among the constituent elements disclosed below, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

(Network Configuration)

FIG. 1 illustrates a network configuration according to the present embodiment. Terminal apparatuses 111, 112, 121, 122, 131, 132, 141, and 142 are configured to generate and transmit a packet (traffic) containing data. Network management apparatuses 1 to 4 and 11 to 14 are configured to have functions of routers. For the purpose of description, the terminal apparatuses 111, 112, 121, 122, 131, 132, 141, and 142 are referred to collectively as a terminal apparatus 111, and the network management apparatuses 1 to 4 and 11 to 14 are referred to collectively as a network management apparatus 1. A packet to be generated may be a packet in compliant with, for example, Internet Protocol Version 4 (IPv4) protocol or IPv6 protocol.

The terminal apparatus 111 may refer to a mobile or fixed user-end device such as a user equipment (UE), a mobile station (MS), mobile station equipment, a mobile terminal, a subscriber unit, a subscriber station, a wireless terminal, and a mobile device. The terminal apparatus 111 may also be a device such as a cellular phone, a smart phone, a personal digital assistant (PDA), a tablet, a laptop, a handheld communication device, and a handheld computing device, a satellite radio, a wireless modem card, or a Customer Premises Equipment (CPE).

The network management apparatus 1 controls to forward a received packet by referring to a destination address (i.e., a destination IP address) contained in the packet. For example, in a case where the terminal apparatus 111 transmits a generated packet to the terminal apparatus 132, the terminal device 111 transmits the packet to the network management apparatus 11. The network management apparatus 11 then retrieves the destination address from the packet received from the terminal apparatus 111 and calculates the network address of the destination address. The network management apparatus 11 then refers to its own routing table to determine a network management apparatus to which the packet is to be forwarded and forwards the packet accordingly. In FIG. 1, for example, the network management apparatus 11 forwards the packet to the network management apparatus 1. The packet is then, for example, based on the routing table contained in each of the network management apparatuses, forwarded to the network management apparatus 3 and the network management apparatus 13, and finally reaches the destination terminal apparatus 132.

In order for such packet forwarding, the network management apparatus 1 updates its own routing table. For updating, each of the network management apparatuses aggregates the IP prefixes managed by lower-level one of more networks (i.e., subnetworks) which are managed by each of the network management apparatuses and advertises the aggregated IP prefix to other network management apparatuses. In the example in FIG. 1, the network management apparatus 11 aggregates a plurality of IP prefixes in the network 110 including IP prefixes of the terminal apparatus 111 and the terminal apparatus 112 to generate the aggregated IP prefix and advertises the aggregated IP prefix to the network management apparatus 1 and the network management apparatus 2. The same is true for the network 120, where the network management apparatus 12 advertises the aggregated IP prefix which is an aggregation of a plurality of IP prefixes in the network 120. The network management apparatus 1 that receives the aggregated IP prefixes of the network 110 and the network 120 then aggregates a plurality of IP prefixes in the network 10 including the aggregated IP prefixes and generates an aggregated IP prefix and advertises the generated aggregated IP prefix to the network management apparatus 3 and network management apparatus 4. Such an advertisement procedure may be also performed in the networks 20, 130, and 140.

In the present embodiment, each of the network management apparatuses is configured to advertise not only the generated aggregate IP prefix, but also the aggregated IP prefix in the lower-level networks. For example, the network management apparatus 1 is configured to advertise (leak) the aggregated IP prefix in the network 10, but also the aggregated IP prefix in the network 110 and the network 120. In other words, the network management apparatus 1 is configured to advertise multi-level IP prefixes (i.e., multi-level routes).

(Functional Configuration of Network Management Apparatus)

Figure 2:
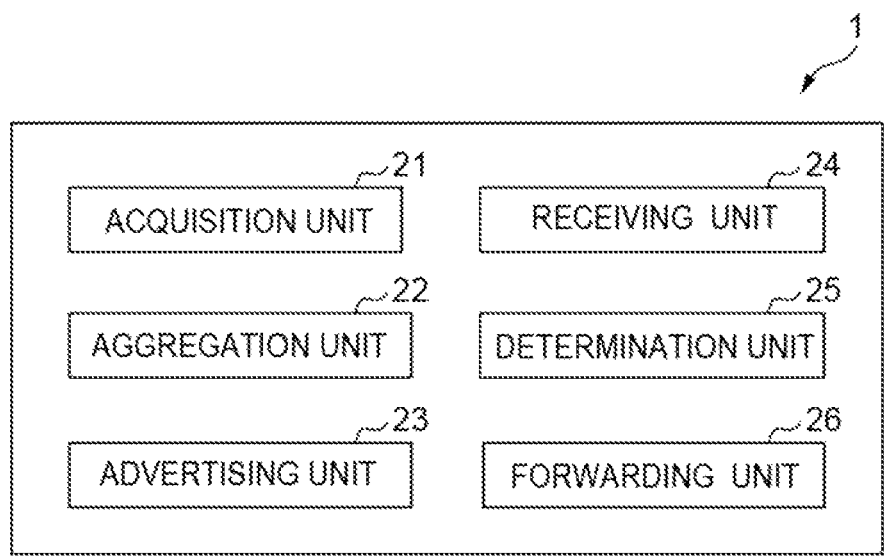
FIG. 2 illustrates an example of a functional configuration of a network management apparatus according to the present embodiment.

FIG. 2 illustrates a functional configuration of the network management apparatus 1. The network management apparatuses 2 to 4 and 11 to 14 may also have the same functional configuration as in FIG. 2.

The acquisition unit 21 acquires routing information from an apparatus in one or more lower-level networks managed by the network management apparatus 1. In the case of the network management apparatus 1, the acquisition unit 21 acquires, as the routing information, a plurality of IP prefixes in the network 10 including the aggregated IP prefixes generated by the network management apparatus 11 and the network management apparatus 12. In the case of the network management apparatus 11, the acquisition unit 21 acquires, as the routing information, a plurality of IP prefixes in the network 110.

The aggregation unit 22 generates aggregated routing information from the routing information acquired by the acquisition unit 21. In the case of the network management apparatus 1, the aggregation unit 22 aggregates a plurality of IP prefixes in network 10 and generates the aggregated IP prefix as the aggregating routing information. In the case of the network management apparatus 11, the aggregation unit aggregates a plurality of IP prefixes in network 110 and generates the aggregated IP prefix as the aggregating routing information. The advertising unit 23 advertises the aggregated route information generated by the aggregation unit 22. In the present embodiment, the advertising unit 23 also advertises the routing information acquired by the acquisition unit 21.

The receiving unit 24 receives a packet from apparatuses in one or more lower-level networks managed by the network management apparatus 1.

The determination unit 25 holds the routing table of the network management apparatus 1 and determines the forwarding destination of the packet based on the routing table. The determination unit 25 determines the forwarding destination according to the longest match rule. That is, in a case where a plurality of available networks exist in the routing table, the determination unit 25 determines the route with longest matching address bits (prefix length) in destination network as the forwarding destination of the packet.

The forwarding unit 26 forwards the packet received by the receiving unit 24 to the packet forwarding destination apparatus determined by the determination unit 25.

In this way, in the present embodiment, the advertising unit 23 is configured to advertise the aggregated routing information generated by the aggregation unit 22 and the routing information acquired by the acquisition unit 21. For example, the IP prefix in the network 110 managed by the network management apparatus 11 has a prefix length=44 (e.g., 240b:xxxx:abc::/44), and similarly the IP prefix in the network 120 has a prefix length=44, and the aggregated IP prefix generated by the network management apparatus 1 has a prefix length=32 (e.g., 240b:xxxx::/32). In such case, the network management apparatus 1 may advertise two IP prefixes with a prefix length=44 (routing information) and one IP with a prefix length=32 (aggregated routing information).

This allows the network management apparatus 3 and the network management apparatus 4 to which these IP prefixes are advertised may acquire IP prefix information in the network 10 as well as in networks 110 and 120.

(Hardware Configuration of Network Management Apparatus)

Figure 3:
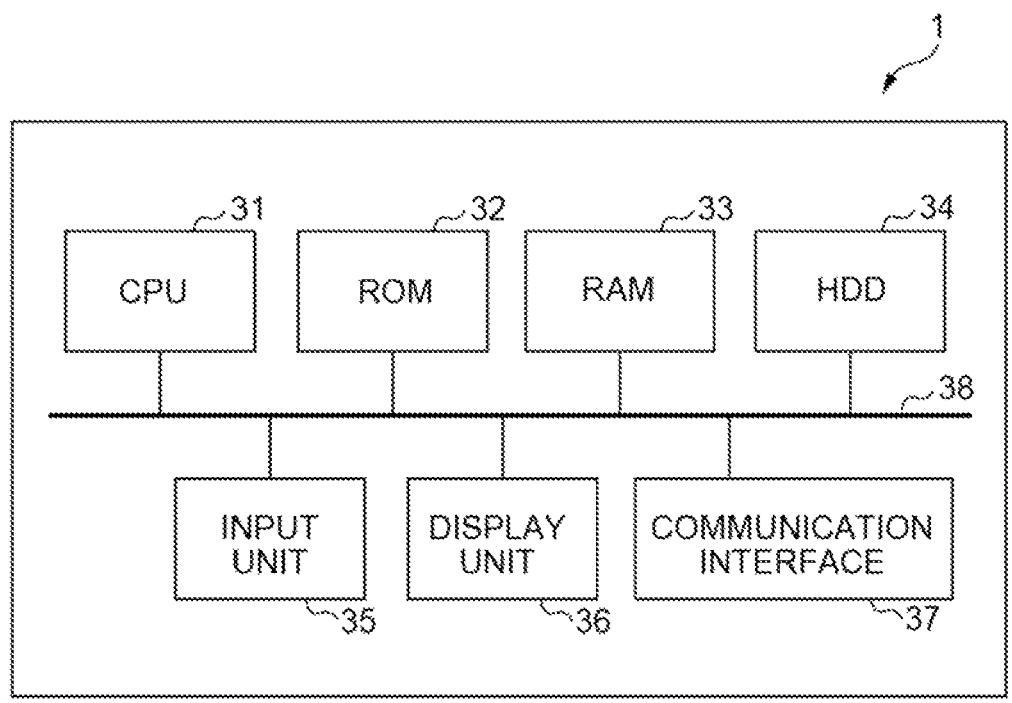
FIG. 3 illustrates an example of a hardware configuration of a network management apparatus according to the present embodiment.

FIG. 3 illustrates an example of a hardware configuration of the network management apparatus 1. The network management apparatuses 2 to 4 and 11 to 14 may also have a hardware configuration similar to the configuration in FIG. 3.

The network management apparatus 1 in the present embodiment may be implemented on a single or multiple, any computer or any other processing platform. The network management apparatus 1 may be implemented on a general-purpose server device comprising a cloud, or on a dedicated server device.

Referring to FIG. 3, the network management apparatus 1 is shown as being implemented in a single computer, while the network management apparatus 1 according to the present embodiment may implemented in a computer system including multiple computers. The following is an example of a case in which this is the case. The plurality of computers may be connected communicatively with each other by a wired or wireless network.

As shown in FIG. 3, the network management apparatus 1 consists of a Central Processing (CPU) 31 and a Read Only Memory (ROM) 32, a Random Access Memory (RAM) 33, a Hard Disc Drive (HDD) 34, an input unit 35, a display unit 36, a communication interface (I/F) 37 and a system bus 38. The network management apparatus 1 may also be equipped with an external memory.

The CPU 31 is for controlling the operation of each of the components (i.e., the components 32 to 37) via the system bus 38 which is a data transmission path to control the overall operation in the network management apparatus 1.

The ROM 32 is a nonvolatile memory that stores a control program or the like which is necessary for the CPU 31 executing processing. The program may be stored in a nonvolatile memory such as the HDD 34, a Solid-State Drive (SSD), or in an external memory such as a removable storage medium (not shown).

The RAM 33 is a volatile memory and functions as the main memory, work area, etc., for CPU 31. In other words, the CPU 31, when executing processing, loads the necessary programs, etc., stored in the ROM 32 onto the RAM 33 and executes the program to realize various functional operations.

The HDD 34 stores, for example, various data, various information, etc., necessary for the CPU 31 executing processing. Also, the HDD 34 stores, for example, various data, various information, etc., obtained through processing by the CPU 31.

The input unit 35 may be composed of a pointing device such a keyboard or a mouse.

The display unit 36 may be composed of a monitor such as a liquid crystal display (LCD). The display 36 may provide a Graphical User Interface (GUI) for inputting, to the network management apparatus 1, various parameters or communication parameters used in communication with other devices.

The communication I/F 37 is an interface that controls communication between the network management apparatus 1 and external devices.

At least some of the functions of each functional element of the network management apparatus 1 shown in FIG. 2 may be realized by the CPU 31 executing the program. However, at least some of the functions of each functional element of the network management apparatus 1 shown in FIG. 2 may be operated as dedicated hardware. In such case, the dedicated hardware operates under the control of the CPU 31.

(Processing Flow)

Figure 4:
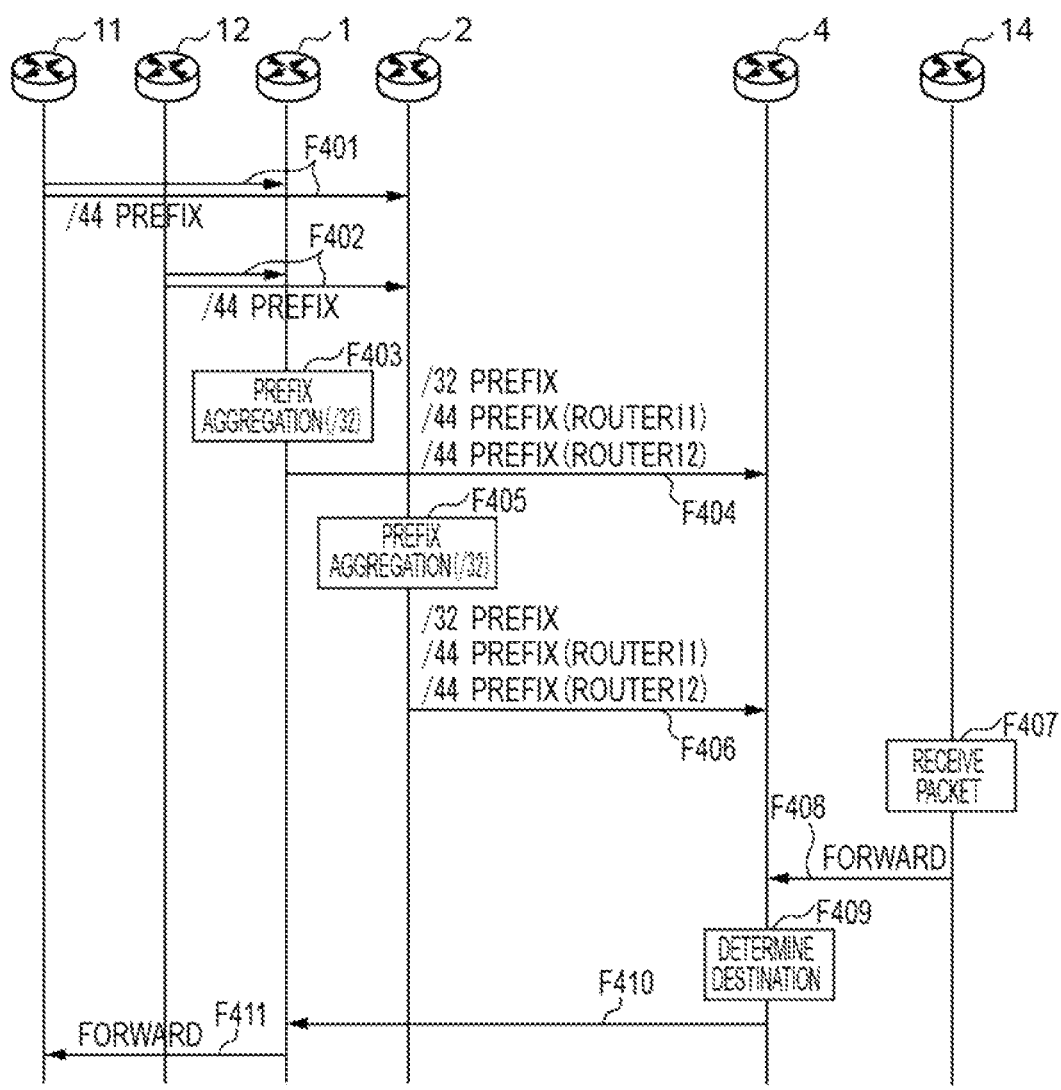
FIG. 4 illustrates an example of a processing flow according to the present embodiment.

Next, a processing flow in the present embodiment is described referring to FIG. 4. FIG. 4 illustrates an example of the processing flow in the present embodiment and the proceeding flow is described referring to the network configuration in FIG. 1.

In F401, the network management apparatus 11 advertises the aggregated IP prefix (prefix length=44) which is an aggregation of a plurality of IP prefixes in the network 110 to the network management apparatus 1 and the network management apparatus 2. Similarly, in F402, the network management apparatus 12 advertises the aggregated IP prefix (prefix length=44) which is an aggregation of a plurality of IP prefixes in the network 120 to the network management apparatus 1 and the network management apparatus 2. The acquisition unit 21 of the network management apparatus 1 acquires the aggregated IP prefixes advertised in F401 and in F402.

In F403, the aggregation unit 22 of the network management apparatus 1 aggregates a plurality of prefix in the network 10 that include the acquired aggregated IP prefixes to generate the aggregated IP prefix (prefix length=32). Then, in F404, the advertising unit 23 of the network management apparatus 1 advertises the aggregated IP prefixes (i.e., the routing information) acquired from the network managing apparatus 11 and the network managing apparatus 12 and the aggregated IP prefix (i.e., aggregating routing information) generated in F403. Similarly, in F405, the aggregation unit 22 of the network management apparatus 2 aggregates a plurality of prefix in the network 10 that include the acquired aggregated IP prefixes to generate the aggregated IP prefix (prefix length=32). Then, in F406, the advertising unit 23 of the network management apparatus 2 advertises the aggregated IP prefixes acquired from the network managing apparatus 11 and the network managing apparatus 12 (i.e., the routing information) and the aggregated IP prefix generated in F405 (i.e., aggregating routing information).

After the advertisement, for example, it is assumed that a packet to be transmitted to the terminal apparatus 111 is generated at the terminal apparatus 141. The terminal apparatus 141 generates and transmits the packet to the network management apparatus 14. The receiving unit 24 of the network management apparatus 14 receives the packet, and the forwarding unit 26 of the network management apparatus 14 forwards the packet, according to its own routing table of the network management apparatus 14, to other network management apparatus (F407, F408). In this example, the network management apparatus 14 may forward the packet to the network management apparatus 4. The receiving unit 24 of the network management apparatus 4 receives the packet from the network management apparatus 14.

In F409, the determination unit 25 of the network management apparatus 4 determines the destination apparatus for the packet according to its own routing table. In other words, the determination unit 25 determines, as the destination apparatus, the network management apparatus 1 or the network management apparatus 2. As mentioned above, the network management apparatus 4 is advertised not only the aggregated IP prefix (prefix length=32), but also the aggregated IP prefix (prefix length=44). Therefore, the determination unit 25 can determine the destination apparatus from the destination prefix and the aggregated IP prefix (prefix length=44) of the packet according to the longest match rule. In this example, the determination unit 25 of the network management apparatus 4 may determine to, based on the various routing information transmitted in F404 and F406, forward the packet to the network management apparatus 1. In F410, the forwarding unit 26 of the network management apparatus 4 forwards the packet to the network management apparatus 1. In F411, the network management apparatus 1 forwards the packet to the network management apparatus 11 which manages the destination apparatus of the packet, i.e., the terminal device 111. The network management apparatus 11 transmits the packet to the terminal apparatus 111 (not shown in FIG. 4).

The advertising unit 23 of the network management apparatus 1 and the advertising unit 23 of the network management apparatus 2 may advertise the routing information and the aggregated routing information as well as cost information for a network management apparatus in a lower-level network. Generally, the cost information is information indicating a distance to the destination network (i.e., cost on the route). In other word, the cost information indicates a distance between a given location in a source network and a given location in a destination network. For example, in F401, the network management apparatus 11 may advertise the cost information (e.g., reachable distance the from network management apparatus 11 to the network management apparatus 1) to the network management apparatus 1. The cost information may be preconfigured in the system or may be configured to be acquired by each of the network management apparatuses using a predetermined method. Then, in F404, the network management apparatus 1 may also advertise the cost information for network management apparatus 11 acquired in F401. Similarly, in F402, the network management apparatus 12 may advertise the cost information for the network management apparatus 12 (e.g., reachable distance the from network management apparatus 12 to the network management apparatus 2), and in F406, the network management apparatus 2 may also advertise the cost information. This allows the network management apparatus 4 to acquire the cost information for the network management apparatus 11 and the network management apparatus 12 respectively.

In this case, in F409 to F411, the packet may be forwarded from the network management apparatus 4 in consideration for the cost information for the network management apparatus 11 and the network management apparatus 12. In other words, in a case where the destination apparatus of the packet is the terminal apparatus 111, the packet may be forwarded efficiently so that the packet is forwarded to the network management apparatus 11 that manages terminal apparatus 111.

Note that the cost information may indicate (or include) a location (e.g., a distance) between a network management apparatus and a network management apparatus in an upper-level network. For example, the cost information for the network management apparatus 11 may indicate (or include) a distance between a given location in the network 110 and the network management apparatus 11.

Figure 5A:
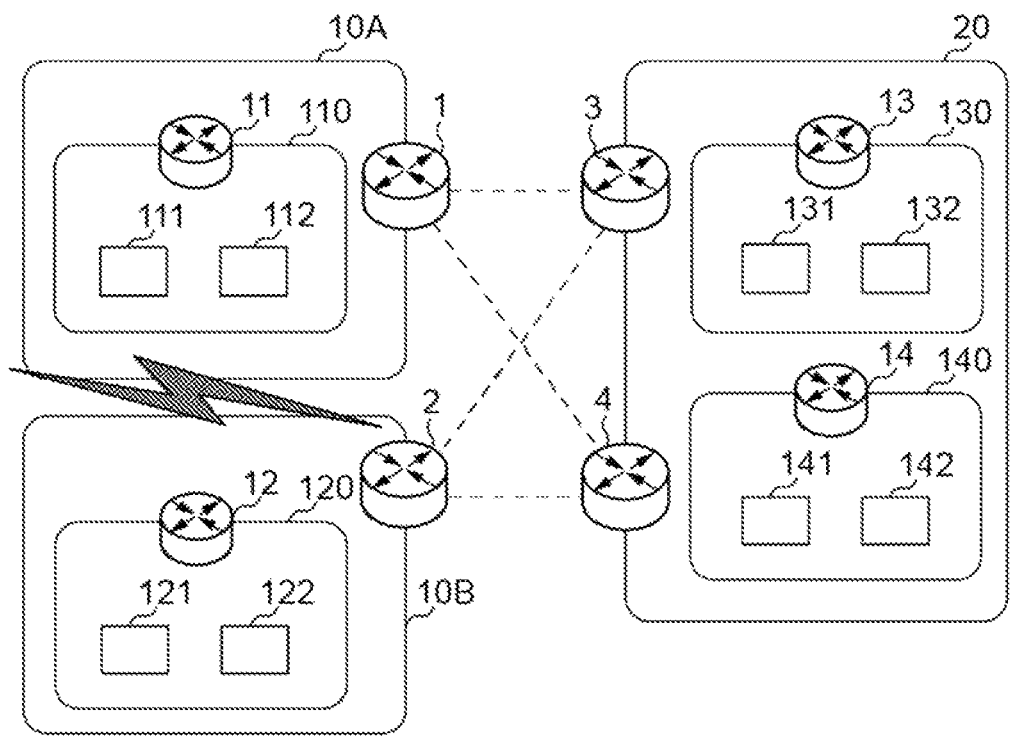
FIG. 5A illustrates an example of packet forwarding in the event of network fragmentation according to the present embodiment.
Figure 5B:
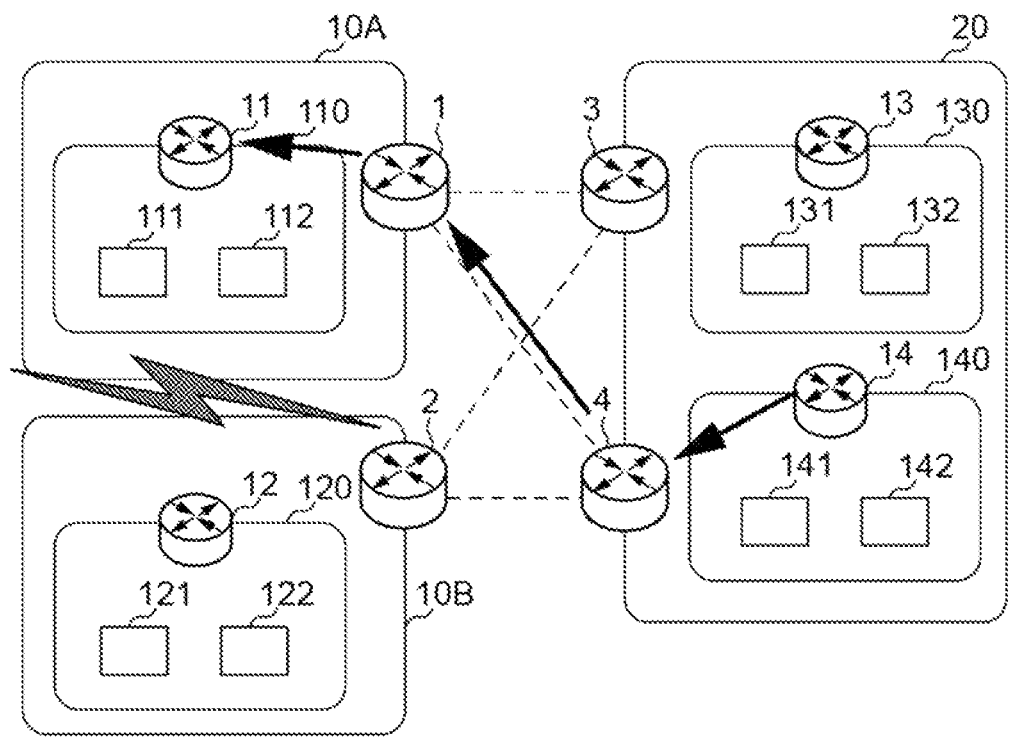
FIG. 5B illustrates an example of packet forwarding in the event of network fragmentation according to the present embodiment.

Advertising the cost information to the network management apparatus along with the routing information and the aggregated routing information is also effective in the event of network fragmentation. An example of packet forwarding during network fragmentation is described referring to FIG. 5A and FIG. 5B. FIG. 5A and FIG. 5B illustrate examples of packet forwarding in the event of network fragmentation.

For example, as shown in FIG. 5A, the case is assumed where network failure has occurred in the network 10, and the network 10 is divided into the network 10A and the network 10B. In a case where the terminal apparatus 141 transmits a packet to the terminal apparatus 111, the network management apparatus 14 receives the packet from the terminal apparatus 141 and forwards it to the network management apparatus 4. The network management apparatus 4 may determine the destination apparatus of the packet based on the cost information for the network management apparatus 11, the cost information for the network management apparatus 12, the destination prefix of the packet, the advertised routing information and aggregated routing information. In the example in FIG. 5B, the network management apparatus 4 may forward the packet to the network management apparatus 1, which is closer to the network management apparatus 11. The network management apparatus 1 then may forward the packet to the network management apparatus 11, and network management apparatus 11 may forward the packet to the terminal apparatus 111. Therefore, even when the network 10 is divided to the network 10A and the network 10B, packet forwarding would be done successfully since the network management apparatus 4 can forward the packet to the network management apparatus 1 instead of the network management apparatus 2. This may improve tolerance of network failure.

According to the present embodiment, each of the network management apparatuses can forward a packet efficiently since it advertises not only the routing information but also the aggregated routing information. In addition, by having each of the network management apparatuses advertise the reachability distance from the network management apparatus in the lower-level network to the network management apparatus in the upper-level network (i.e., the cost information), each of the network management apparatus can forward a packet more efficiently by using the cost information. Such a process may avoid long travelling in packet forwarding and improve tolerance of network failure since a packet may be delivered to the destination apparatus even in the event of network failure.

In the present embodiment, the processing applicable to the network management apparatuses 1 to 4 is mainly described, but the processing is also applicable to the network management apparatuses 11 to 14 and unshown other network management apparatus managed by the network management apparatuses 11 to 14. For example, the network management apparatus 11 may advertise, to the network management apparatus 1 and the network management apparatus 2, the aggregated IP prefix in the network 110 (aggregated routing information) as well as the IP prefixes in one or more unshown networks managed by the network 110 (e.g., prefix length=64) (routing information).

In the present embodiment, the case is described in which the network management apparatus 1 advertises the IP prefixes of two different lengths, but the network management apparatus may be configured to advertise the IP prefixes of three or more different lengths. For example, the network management apparatus 1 may be configured to receive or generate and advertise the IP prefixes in unshown one or more network managed by network 110 and network 120 (e.g., prefix length=64) and the aggregated IP prefixes in multiple levels (e.g., prefix length=44, prefix length=32).

In addition, as mentioned above, the present embodiment is applicable to both IPv4 and IPv6. In a case of IPV6, advantageous effect of the present embodiment may be achieved since more devices may be assigned an IP address, and therefore more devices may be assigned an IP address with the same prefix length.

While specific embodiments have been described above, the embodiments are illustrative only and are not intended to limit the scope of the invention. The apparatus and method described herein may be embodied in other forms than as described above. In addition, it is also possible to appropriately omit, replace, and change the above-described embodiment without departing from the scope of the present invention. Such omissions, substitutions and alterations fall within the scope of the appended claims and their equivalents and fall within the scope of the present invention.

REFERENCE SIGNS LIST

1 to 4; 11 to 14: Network management apparatus, 111; 112; 121; 122; 131; 132; 141; 142: Terminal apparatus, 21: Acquisition unit, 22: Aggregation unit 23: Advertising unit; 24: Receiving unit; 25: Determination unit; 26: Forwarding unit

What is claimed is:

1. A network management apparatus in a first network comprising:
   at least one memory configured to store program code; and
   electric circuitry including at least one processor, the at least one processor being configured to read and operate according to the program code to:
      acquire IP prefix information managed in each of one or more subnetworks in the first network as routing information, the one or more subnetworks being lower-level network than the first network;
      generate aggregated IP prefix information which is an aggregation of the IP prefix information managed in each of the one or more subnetworks as aggregated routing information, wherein the IP prefix information comprises a first prefix length, the aggregated IP prefix information comprises a second prefix length and a third prefix length, and the first prefix length is different than the second prefix length, and the second prefix length is different than the third prefix length; and advertise the routing information and the aggregated routing information to a second network different from the first network, wherein the at least one processor is further configured to read and operate according to the program code to advertise cost information which is distance information from a location in each of the subnetworks to the network management apparatus.

2. A network management method comprising:

acquiring IP prefix information managed in each of one or more subnetworks in a first network as routing information, the one or more subnetworks being lower-level network than the first network;

generating aggregated IP prefix information which is an aggregation of the IP prefix information managed in each of the one or more subnetworks as aggregated routing information, wherein the IP prefix information comprises a first prefix length, the aggregated IP prefix information comprises a second prefix length and a third prefix length, and the first prefix length is different than the second prefix length, and the second prefix length is different than the third prefix length;

advertising the routing information and the aggregated routing information to a second network different from the first network; and advertising cost information which is distance information from a location in each of the subnetworks to the network management apparatus.

* * * * *